(12) United States Patent
Worsley et al.

(10) Patent No.: US 9,601,226 B2
(45) Date of Patent: Mar. 21, 2017

(54) HIGH-DENSITY 3D GRAPHENE-BASED MONOLITH AND RELATED MATERIALS, METHODS, AND DEVICES

(71) Applicant: Lawrence Livermore National Security, LLC, Livermore, CA (US)

(72) Inventors: Marcus A. Worsley, Hayward, CA (US); Theodore F. Baumann, Discovery Bay, CA (US); Juergen Biener, San Leandro, CA (US); Supakit Charnvanichborikarn, Livermore, CA (US); Sergei Kucheyev, Oakland, CA (US); Elizabeth Montalvo, Oakland, CA (US); Swanee Shin, Emeryville, CA (US); Elijah Tylski, Platte City, MO (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 516 days.

(21) Appl. No.: 13/844,340

(22) Filed: Mar. 15, 2013

(65) Prior Publication Data
US 2014/0178289 A1     Jun. 26, 2014

Related U.S. Application Data

(60) Provisional application No. 61/745,528, filed on Dec. 21, 2012.

(51) Int. Cl.
*B32B 9/00* (2006.01)
*H01B 1/04* (2006.01)

(52) U.S. Cl.
CPC .................................... *H01B 1/04* (2013.01)

(58) Field of Classification Search
None
See application file for complete search history.

(56) References Cited

U.S. PATENT DOCUMENTS 5,207,814 A    5/1993   Cogliati
5,879,744 A    3/1999   Cao
(Continued)

FOREIGN PATENT DOCUMENTS

WO    WO2011/063103   *  5/2011 ............. H01L 31/00

OTHER PUBLICATIONS

Al-Muhtaseb, et al., "Preparation and properties of resorcinol-Formaldehyde organic and carbon gels", Advanced Materials, No. 2, 15: 101-114, (2003).
(Continued)

*Primary Examiner* — Humera Sheikh
*Assistant Examiner* — Seth Dumbris
(74) *Attorney, Agent, or Firm* — Foley & Lardner LLP

(57) ABSTRACT

A composition comprising at least one high-density graphene-based monolith, said monolith comprising a three-dimensional structure of graphene sheets crosslinked by covalent carbon bonds and having a density of at least 0.1 g/cm$^3$. Also provided is a method comprising: preparing a reaction mixture comprising a suspension and at least one catalyst, said suspension selected from a graphene oxide (GO) suspension and a carbon nanotube suspension; curing the reaction mixture to produce a wet gel; drying the wet gel to produce a dry gel, said drying step is substantially free of supercritical drying and freeze drying; and pyrolyzing the dry gel to produce a high-density graphene-based monolith. Exceptional combinations of properties are achieved including high conductive and mechanical properties.

21 Claims, 7 Drawing Sheets

(56) References Cited

U.S. PATENT DOCUMENTS

| | | | |
|---|---|---|---|
| 5,885,953 | A | 3/1999 | Jadesjo |
| 7,378,188 | B2 | 5/2008 | Struthers |
| 7,410,718 | B2 | 8/2008 | Cooper |
| 7,811,711 | B2 | 10/2010 | Cooper |
| 8,993,113 | B2* | 3/2015 | Pauzauskie et al. ......... 428/408 |
| 2010/0105834 | A1* | 4/2010 | Tour et al. ................ 525/50 |
| 2010/0144904 | A1 | 6/2010 | Wang |
| 2010/0187484 | A1 | 7/2010 | Worsley |
| 2011/0186786 | A1* | 8/2011 | Scheffer et al. ............ 252/510 |
| 2011/0189452 | A1* | 8/2011 | Lettow et al. ............. 428/220 |
| 2011/0287241 | A1* | 11/2011 | Korkut et al. ............. 428/219 |
| 2012/0034442 | A1* | 2/2012 | Pauzauskie et al. ......... 428/219 |
| 2014/0147648 | A1* | 5/2014 | Zhamu .................. C30B 5/00 428/220 |
| 2014/0154941 | A1* | 6/2014 | Zhamu .................. H01B 1/04 442/136 |

OTHER PUBLICATIONS

Arora, et al., "Capacity fade mechanisms and side reactions in Lithium-Ion batteries", J. Electroshem. Soc., 145(10): 3647-3667, (1998).
Balandin, et al., "Superior thermal conductivity of single-layer graphene", Nano Letters, vol. 8, No. 3, 902-907, (2008).
Baldan, et al., "Raman validity for crystallite size $L_a$ determination on reticulated vitreous carbon with different graphitization index", Applied Surface Science, 254: 600-603, (2007).
Batson, "Carbon 1s near-edge-absorption fine structure in graphite", Physical Review B, vol. 48, No. 4, 2608-2610, (1993).
Baumann, et al., "Facile synthesis of a crystalline, high-surface-area $SnO_2$ aerogel", Advanced Materials, 17: 1546-1548, (2005).
Biener, et al., "Advanced carbon aerogels for energy applications", Energy & Environmental Science, 4:656-667, (2011).
Chen, et al., "In situ self-assembly of mild chemical reduction graphene for three-dimensional architectures", Nanoscale, 3: 3132-3137, (2011).
Chen, et al., "Three-dimensional flexible and conductive interconnected grapheme networks grown by chemical vapour deposition", Nature Materials, vol. 10, pp. 424-428, (2011).
Cote, et al., "Flash reduction and patterning of graphite oxide and its polymer composite", JACS Articles, 131: 11027-11032, (2009).
Eda, et al., "Large-area ultrathin films of reduced graphene oxide as a transparent and flexible electronic material", Nature Nanotechnology, vol. 3, 270-274, (2008).
Ferrari, et al., "Interpretation of Raman spectra of disordered and amorphous carbon", Physical Review B, vol. 61, No. 20, 14095-14107, (2000).
Ferrari, et al., "Raman spectrum of graphene and graphene layers", PRL 97: 187401-1-187401-4, (2006).
Fowler, et al., "Practically chemical sensors from chemically deprived graphene", ACSNANO, vol. 3, No. 2, 301-306, (2009).
Gash, et al., "Strong Akaganeite aerogel monoliths using epoxides: Synthesis and Characterization", Chem. Materials, 15: 3268-3275, (2003).
Geim, et al., "The rise of graphene", Nature Materials, vol. 6, 183-191, (2007).
Ghosh, et al., "Extremely high thermal conductivity of graphene: Prospects for thermal management applications in nanoelectronic circuits", Applied Physics Letters, 92: 151911-1-151911-3, (2008).
Gomez-Navarro, et al., "Electronic transport properties of individual chemically reduced graphene oxide sheets", Nano Letters, vol. 7, No. 11, 3499-3503, (2007).
Graf, et al., "Spatially resolved Raman spectroscopy of single and few-layer graphene", Nano Letters, vol. 7, No. 2, 238-242, (2007).
Gregg, et al., Adsorption, surface area and porosity, Second Edition, Academic Press 1982, Cover and table of contents.
Ha, et al., "Binder-free and carbon-free nanoparticle batteries: A method for nanoparticle electrodes without polymeric binders or carbon black", Nano Letters, 12: 5122-5130, (2012).
Huang, et al., "In Situ observation of the electrochemical Lithiation of a single $SnO_2$ Nanowire electrode", Science, vol. 330, 1515-1520, (2010).
Hummers, et al., "Preparation of Graphite Oxide", Contribution from the Baroid Graphitic Oxide, 1339, (1958).
Hwang, et al., "Carrier transport in two-dimensional graphene layers", Physical Review Letters, 186806-1-186806-4, (2007).
Iler, Ralph, The chemistry of Silica: Solubility, Polymerization, Colloid and surface properties and biochemistry of Silica, ISBN:9780471024040, Cover and Table of Contents, 1979.
Jain, et al., "Structural studies of lithium intercalation in a nanocrystalline $\alpha$-$Fe_2O_3$ compound", Chem. Materials, 18: 423-434, (2006).
Jeong, et al., "X-ray absorption spectroscopy of graphite oxide", EPL, 67004-p1-67004-p5, (2008).
Jeong, et al., Comment on "Near-Edge x-Ray absorption fine-structure investigation of graphene", PRL, 102: 099701-1, (2009).
Kucheyev, et al., "Depth-sensing indentation of low-density brittle nanoporous solids", Acta Materialia, 57: 3472-3480, (2009).
Kuhn, et al., "In situ infrared observation of the pyrolysis process of carbon aerogels", Journal of Non-Crystalline Solids, 225: 58-63, (1998).
Larcher, et al., "Combined XRD, EXAFS, and Mossbauer studies of the reduction by Lithium of $\alpha$-$Fe_2O_3$ with various particle sizes", Journal of Electrochemical Society, 150(12): A1643-A1650, (2003).
Laruelle, et al., "On the origin of the extra electrochemical capacity displayed by MO/Li cells at low potential", Journal of the electrochemical society, 149(5): A627-A634, (2002).
Lee, et al., "Measurement of the elastic properties and intrinsic strength of monolayer grapheme", Science, vol. 321, 385-388, (2008).
Li, et al., "Highly conducting graphene sheets and Langmuir-Blodgett films", Nature Nanotechnology, vol. 3, 538-542, (2008).
Liu, et al., "A controllable self-assembly method for larger-scale synthesis of graphene sponges and free-standing graphene films", Advanced Functional Materials, 20: 1930-1936, (2010).
Lu, et al., "Thermal and electrical conductivity of monolithic carbon aerogels", Journal of Applied Physics, 73: 581-584, (1993).
Ma, et al., "Core excitons and vibronic coupling in diamond and graphite", Physical Review Letters, vol. 71, No. 22, 3725-3728, (1993).
McAllister, et al., "Single sheet functionalized graphene by oxidation and thermal expansion of graphite", Chem. Mater., 19: 4396-4404, (2007).
Morales, et al., "Synthesis and characterization of Nanometric iron and iron—Titanium oxides by mechanical milling: Electrochemical properties as anodic materials in Lithium cells", Journal of the electrochemical society, 152(9): A1748-A1754, (2005).
Morozov, et al., "Giant intrinsic carrier Mobilities in graphene and its bilayer", Physical Review Letters, 016602-1-016602-4, (2008).
Novoselov, et al., "Electric field affect in atomically thin carbon films", Science, vol. 306, 666-669, (2004).
Oliver, et al., "An improved technique for determining hardness and elastic modulus using load and displacement sensing indentation experiments", J. Mater. Res., vol. 7, No. 6, 1564-1583, (1992).
Pacile, et al., "Near-Edge X-Ray absorption fine-Structure investigation of Graphene", PRL, 101: 066806-1-066806-4, (2008).
Pacile, et al., Reply to comment on "Near-Edge X-Ray absorption fine-Structure investigation of Graphene", PRL, 102: 099702, (2009).
Peigney, et al., "Specific surface area of carbon nanotubes and bundles of carbon nanotubes", Carbon, 39: 507-514, (2001).
Peled, "Lithium stability and film formation in organic and inorganic electrolyte for lithium battery systems", Department of Chemistry, Tel-Aviv University, Israel, pp. 43-72, (1983).
Pekala, et al., "Resorrcinol-Formaldehyde aerogels and their carbonized derivatives", Abstracts of Papers of the American Chemical Society, 197, 113, (1989).
Poizot, et al., "Nano-sized transition-metal oxides as negative-electrode materials for lithium-ion batteries", Nature, vol. 407, 496-499, (2000).
Ramanathan, et al., "Functionalized graphene sheets for polymer nanocomposites", Nature Nanotechnology, vol. 3, 327-331, (2008).

(56) References Cited

OTHER PUBLICATIONS

Schedin, et al., "Detection of individual gas molecules adsorbed on graphene", Nature Materials, vol. 6, 652-655, (2007).
Shao, et al., "Graphene based electrochemical sensors and biosensors: A Review", Electroanalysis, 22: No. 10, 1027-1036, (2010).
Stankovich, et al., "Graphene-based composite materials", Nature Letters, vol. 442, 282-286, (2006).
Joachim Stohr, Nexafs Spectroscopy; Spinger-Verlag: Berlin—Heidelberg—New York, Cover and Table of Contents, (1992).
Sutter, et al., "Epitaxial graphene on ruthenium", Nature Materials, vol. 7, 406-411, (2008).
Takai, et al., "Structure and electronic properties of a nongraphitic disordered carbon system and its heat-treatment effects", Physical Review B, 67: 214202-1-214202-11, (2003).
Tang, et al., "Noble-metal-promoted three-dimensional macroassembly of single-layered graphene oxide", Angew. Chem., 49: 4603-4607, (2010).
Verdejo, et al., "Functionalized graphene sheet filled silicone foam nanocomposites", Journal of Materials Chemistry, 18: 2221-2226, (2008).
Vickery, et al., "Fabrication of graphene-polymer nanocomposites with higher-order three-dimensional architectures", Advanced Materials, 21: 2180-2184, (2009).
Vivekchand, et al., "Graphene-based electrochemical supercapacitors", J. Chem. Sci., vol. 120, No. 1, 9-13, (2008).
Vollmer, et al., "Electronic and structural properties of graphene-based transparent and conductive thin film electrodes", Appl. Phys A, 94: 1-4, (2009).
Wang, et al., "Graphene Aerogels", ECS Transactions, 19(5): 241-247, (2009).
Wang, et al., "$Mn_3O_4$-Graphene hybrid as a high-capacity anode material for lithium ion batteries", J. Am. Chem. Soc, 132: 13978-13980, (2010).
Wang, et al., "Ternary self-assembly of ordered metal oxide-Graphene nanocomposites for electrochemical energy storage", vol. 4, No. 3, 1587-1595, (2010).
Wang, et al., "Transparent, conductive graphene electrodes for dye-sensitized solar cells", Nano Letters, vol. 8, No. 1, 323-327, (2008).
Worsley, et al., "High surface area carbon nanotube-supported titanium carbonitride aerogels", Journal of Materials Chemistry, 19: 5503-5506, (2009).
Worsley, et al., "High surface area, $sp^2$-cross-linked three-dimensional grapheme monoliths", The Journal of Physical Chemistry Letters, 2: 921-925, (2011).
Worsley, et al., "Mechanically robust 3D grapheme macroassembly with high surface area", Electronic Supplementary Material (ESI) for Chemical Communications, 1-6, (2012).
Worsley, et al., "Mechanically robust 3D grapheme macroassembly with high surface area", Chemical Communications, 48: 8428-8430, (2012).
Worsley, et al., "Mechanically robust and electrically conductive carbon nanotube foams", Applied Physics Letters, 94: 073115-1-073115-3, (2009).
Worsley, et al., "Properties of single-walled carbon nanotube-based aerogels as a function of nanotube loading", Acta Materialia, 57: 5131-5136, (2009).
Worsley, et al., "Stiff and electrically conductive composites of carbon nanotube aerogels and polymers", Journal of Materials Chemistry, 19: 3370-3372, (2009).
Worsley, et al., Carbon scaffolds for stiff and highly conductive monolithic oxide—carbon nanotube composites, Chemistry of Materials, 23: 3054-3061, (2011).
Worsley, et al., Synthesis of Graphene Aerogel with high electrical conductivity, JACS Communications, 132: 14067-14069, (2010).
Wu, et al., "Graphene anchored with $Co_3O_4$ nanoparticles as anode of lithium ion batteries with enhanced reversible capacity and cyclic performance", vol. 4, No. 6, 3187-3194, (2010).
Wu, et al., "Synthesis of graphene sheets with high electrical conductivity and good thermal stability by hydrogen arc discharge exfoliation", vol. 3, No. 2, 411-417, (2009).
Xu, et al., "Self-assembled graphene hydrogel via a one-step hydrothermal process", ACSNANO, vol. 4, No. 7, 4324-4330, (2010).
Yin, et al., "Assembly of graphene sheets into 3D macroscopic structures", Small, 8, No. 16, 2458-2463, (2012).
Yoo, et al., "Large reversible Li storage of graphene Nanosheet families for use in rechargeable lithium ion batteries", Nano Letters, vol. 8, No. 8, 2277-2282, (2008).
Zhou, et al., "Graphene-wrapped $Fe_3O_4$ anode material with improved reversible capacity and cyclic stability for lithium ion batteries", Chem. Mater., 22: 5306-5313, (2010).
Zhu, et al., Nanostructures reduced grapheme oxide/$Fe_2O_3$ composite as a high-performance anode material for lithium ion batteries, ACSNANO, vol. 5, No. 4, 3333-3338, (2011).
Zu, et al., "Aqueous dispersion of graphene sheets stabilized by pluronic copolymers: Formation of Supramolecular hydrogel", J. Phys. Cem. C, 113: 13651-13657, (2009).

\* cited by examiner of at least 0.2 g/cm³.

HIGH-DENSITY 3D GRAPHENE-BASED MONOLITH AND RELATED MATERIALS, METHODS, AND DEVICES

RELATED APPLICATIONS

This application claims priority to U.S. provisional application Ser. No. 61/745,528 filed Dec. 21, 2012, which is hereby incorporated by reference for all purposes.

FEDERAL FUNDING STATEMENT

The United States Government has rights in the invention pursuant to Contract No. DE-AC52-07NA27344 between the U.S. Department of Energy and Lawrence Livermore National Security, LLC, for the operation of Lawrence Livermore National Laboratory.

BACKGROUND

Individual graphene sheets have attracted significant attention since their isolation (Novoselov et al., *Science* 306, 666 (2004)), due to the multitude of graphene's exceptional properties (Gomez-Navarro et al., *Nano Letters* 7, 3499 (2007); Geim et al., *Nature Materials* 6, 183 (2007); Lee et al., *Science* 321, 385 (2008); Miller et al., *Science* 329, 1637 (2010); Novoselov et al., *Science* 315, 1379 (2007); Schedin et al., *Nature Materials* 6, 652 (2007); Zhu et al., *Adv Mater* 22, 3906 (2010); Chen et al., *Nat Nano* 3, 206 (2008).

Some of the properties observed in this nanoscale, two-dimensional (2D) form of graphitic carbon include room-temperature electrical conductivities up to ~$10^6$ S/cm and Young's moduli up to ~$10^6$ MPa, which are among the highest reported for any material. In an effort to realize the properties of individual graphene sheets on the macro-scale, several groups have recently developed three dimensional (3D) graphene assemblies with many promising characteristics.

Such assemblies are comprised of randomly interconnected graphene sheets with a large degree of porosity (>90%), which is believed to be necessary to minimize restacking of graphene sheets. These low-density nanoporous graphene structures exhibit electrical conductivities and Young's moduli as many as 10 orders of magnitude lower than those observed for individual graphene sheets, which is not surprising given their high porosity. It is a direct consequence of superlinear dependences of electrical and mechanical properties on the monolith density for porous materials.

Macro-scale 3D graphene-based materials exhibiting the exceptional properties, including combinations of properties, of graphene sheets are still a challenge. For example, electrical conductivity might be too low.

SUMMARY

Embodiments provided herein include compositions, devices, and articles, as well as methods of making and methods of using the compositions, devices, and articles.

One embodiment provides for a composition comprising at least one high-density graphene-based monolith, said monolith comprising a three-dimensional structure of graphene sheets crosslinked by covalent carbon bonds and having a density of at least 0.2 g/cm³.

Another embodiment provides a method comprising: preparing a reaction mixture comprising a suspension and at least one catalyst, said suspension selected from a graphene oxide (GO) suspension and a carbon nanotube suspension; curing the reaction mixture to produce a wet gel; drying the wet gel to produce a dry gel, said drying step is substantially free of supercritical drying and freezing drying; and pyrolyzing the dry gel to produce a high-density graphene-based monolith or a high-density carbon-nanotube-based monolith.

Another embodiment provides for a device comprising at least one high-density graphene-based monolith, said monolith comprising a three-dimensional structure of graphene sheets crosslinked by covalent carbon bonds and having a density of at least 0.2 g/cm³.

Another embodiment provides for a composition comprising at least one high-density carbon-nanotube-based monolith, said monolith comprising carbon nanotubes crosslinked by nanoparticles and having a density of at least 0.2 g/cm³.

Another embodiment provides a method comprising: preparing a reaction mixture comprising a suspension and at least one catalyst, said suspension selected from a graphene oxide (GO) suspension and/or a carbon nanotube suspension; curing the reaction mixture to produce a wet gel; drying the wet gel to produce a dry gel without application of heat to raise the temperature beyond ambient temperature; and pyrolyzing the dry gel to produce a high-density graphene-based monolith or a high-density carbon-nanotube-based monolith.

At least one advantage for at least one embodiment is that bulk properties, such as Young's moduli, compressive strength, and electrical conductivity, can exceed those of commercial graphite at nearly half the density. Isotropic properties can approach those of graphene sheets. Another advantage for at least one embodiment is low annealing temperature.

DETAILED DESCRIPTION

Introduction

Figure 1:
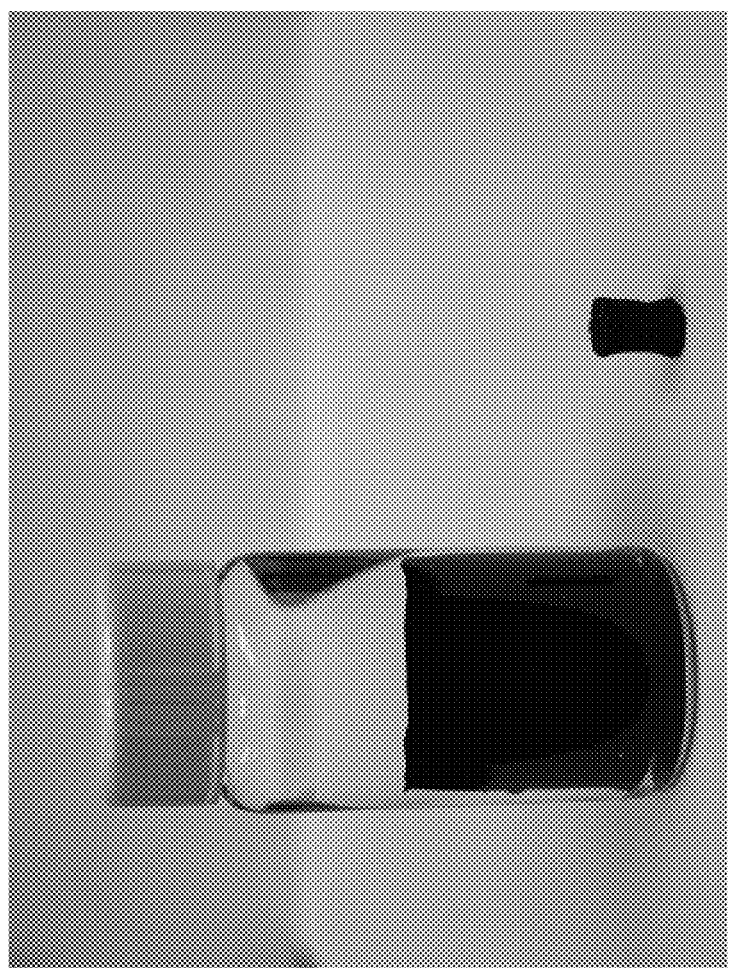
FIG. 1 shows a photograph of the graphene wet gel before (left) and after (right) drying. For reference, the wet gel is in a 20 ml vial.

References cited herein can be used to practice and better understand the claimed inventions and are incorporated by reference herein in their entireties for all purposes.

Priority U.S. provisional application Ser. No. 61/745,528 filed Dec. 21, 2012 is hereby incorporated by reference in its entirety for all purposes including working examples and claims.

US Patent Publication 2012/0034442 to Worsley et al., "Mechanically Stiff, Electrically Conductive Composites of Polymers and Carbon Nanotubes" is incorporated herein by reference in its entirety.

US Patent Publication 2010/0187484 to Worsley et al., "MECHANICALLY ROBUST, ELECTRICALLY CONDUCTIVE ULTRALOW-DENSITY CARBON NANOTUBE-BASED AEROGELS" is incorporated herein by reference in its entirety.

The article, "Mechanically Robust 3D Graphene Macroassembly with High Surface Area," Worsley et al., *Chem. Commun.*, 2012, 48, 8428-8430, is incorporated herein by reference in its entirety.

The article, "Synthesis of Graphene Aerogel with High Electrical Conductivity," Worsley et al., *J. Am. Chem. Soc.*, 2011, 2, 921-925, is incorporated herein by reference in its entirety.

The article, "High Surface Area, sp2-Cross-Linked Three-Dimensional Graphene Monolith," Worsley et al., *J. Phys. Chem. Letter*, 2010, 132(40), 14067-14069, is incorporated herein by reference in its entirety.

The article, "Advanced Carbon Aerogels for Energy Applications," Biener et al., *Energy & Environmental Science*, 2011, 4, 656-667, is incorporated herein by reference in its entirety.

US Patent Publication 2010/0144904 describes graphene aerogel but the material is not crosslinked and is not air-dried.

High-Density Graphene-Based Monolith

A high-density graphene-based monolith described herein can be a black monolith that is mechanically robust, electrically conductive, and of high density. Monolith is a term known in the art. Monolith and methods for making monolith are disclosed in, for example, U.S. Pat. No. 5,207,814, U.S. Pat. No. 5,885,953, U.S. Pat. No. 5,879,744, U.S. Pat. No. 7,378,188, U.S. Pat. No. 7,410,718, and U.S. Pat. No. 7,811,711.

The high-density graphene-based monolith can comprise a three-dimensional structure of graphene sheets crosslinked by chemical linkage such as covalent carbon-carbon bond. In one embodiment, 50% or more, or 70% or more, or 90% or more of the crosslinking covalent bonds are $sp^2$ bonds.

In one embodiment, the high-density graphene-based monolith is substantially free of graphene sheets interconnected only by physical crosslinks (e.g. Van der Waals forces). In one embodiment, less than 10%, or less than 5% or less than 3%, or less than 1% of the graphene sheets are interconnected only by physical crosslinks.

In one embodiment, the high-density graphene-based monolith is substantially free of graphene sheets interconnected only by metal crosslinks (e.g., noble metal such as Pd). In one embodiment, less than 10%, or less than 5% or less than 3%, or less than 1% of the graphene sheets are interconnected only by metal crosslinks.

In one embodiment, the high-density graphene-based monolith is substantially free of graphene sheets with hydroxide or epoxide functionalities. In another embodiment, 10% or less, or 5% or less, or 3% or less, or 1% or less, or 0.5% or less, or 0.1% or less of the carbon atoms in the graphene-based monolith are connected to a hydroxide or epoxide functionality.

The high-density graphene-based monolith comprises, for example, restacking or substantial restacking of graphene sheets. The graphene sheets can have lateral dimensions of, for example, 10 nm or more, 50 nm or more, or 100 nm or more, including 10 nm to 50 nm. The surfaces of the graphene sheets can be, for example, free or substantially free of nanoparticles.

In one embodiment, the high-density graphene-based monolith is not made by stacking non-organic material, such as metals, between graphene sheets.

The high-density graphene-based monolith can have an atomic oxygen content of, for example, 10% or less, or 5% or less, or 3% or less, or 1% or less. The high-density graphene-based monolith can be mesoporous. The average pore size can be, for example, less than 20 nm.

The high-density graphene-based monolith can have a density of, for example, 0.2 $g/cm^3$ or more, or 0.5 $g/cm^3$ or more, or 1.0 $g/cm^3$ or more, or 1.5 $g/cm^3$ or more.

The high-density graphene-based monolith can have a bulk electrical conductivity of, for example, 100 S/cm or more, or 200 S/cm or more, or 500 S/cm or more, or 1,000 S/cm or more, or 1,500 S/cm or more, or 2,000 S/cm or more.

The high-density graphene-based monolith can have a surface area of, for example, 200 $m^2/g$ or more, 100 $m^2/g$ or more, or 70 $m^2/g$ or more, or 50 $m^2/g$ or more, or $m^2/g$ or more.

The high-density graphene-based monolith can have a Young's modulus of, for example, 1 GPa or more, or 5 GPa or more, or 10 GPa or more.

The high-density graphene-based monolith can have a failure stress of, for example, 0.2 GPa or more, or 0.5 GPa or more, or 1 GPa or more.

The high-density graphene-based monolith can have a compressive strength of, for example, 50 MPa or more, or 100 MPa or more, or 200 MPa or more.

High-Density Carbon Nanotube-Based Monolith

An alternative embodiment is for a high-density carbon nanotube-based monolith. In particular, a composition is provided comprising at least one high-density carbon nanotube-based monolith, said monolith comprising carbon nanotubes crosslinked by nanoparticles and having a density of at least 0.2 $g/cm^3$.

In some embodiments, the carbon nanotubes are single-walled carbon nanotubes or double-walled carbon nanotubes. More generally, the carbon nanotubes can be multi-walled nanotubes.

In one embodiment, the carbon-nanotube-based monolith comprises at least 20 wt. % of carbon nanotubes. In one embodiment, the carbon-nanotube-based monolith comprises at least 40 wt. % of carbon nanotubes. In one embodiment, the carbon-nanotube-based monolith comprises at least 60 wt. % of carbon nanotubes. In one embodiment, the carbon-nanotube-based monolith comprises at least 80 wt. % of carbon nanotubes.

In one embodiment, the monolith has a density of at least 0.2 $g/cm^3$. In one embodiment, the monolith has a density of at least 0.5 $g/cm^3$. In one embodiment, the monolith has a density of at least 0.7 $g/cm^3$.

In one embodiment, the monolith has an electrical conductivity of at least 200 S/cm or more. In one embodiment, the monolith has an electrical conductivity of at least 400 S/cm or more.

In one embodiment, the monolith has a Young's modulus of at least 0.5 GPa. In one embodiment, the monolith has a Young's modulus of at least 1 GPa.

Process for Making High-Density Monolith

Precursors to graphene are known in the art. For example, graphene oxide is a general term for oxidized graphene, which can be a precursor to graphene. Closely related precursors can include, for example, graphite oxide, single layer graphene oxide, exfoliated graphite, and the like. See US 2012/0034442, incorporated by reference in its entirety.

Carbon nanotubes are known in the art. See US 2010/0187484, incorporated by reference in its entirety. For example, the carbon nanotube can be a single-walled carbon nanotube, a double-walled carbon nanotube, or a multi-walled carbon nanotube.

In some embodiments, the reaction mixture comprises a graphene oxide (GO) suspension. Methods for making GO are known in the art and disclosed in, for example, Hummer, *J. Am. Chem. Soc.,* 80:1339 (1958), which is incorporated herein by reference in its entirety. In one embodiment, the GO suspension is an aqueous suspension. In another embodiment, the GO suspension is a suspension of at least one organic solvent, such as alcohol, dimethylformamide, tetrahydrofuran, ethylene glycol, N-methylpyrrolidone, etc. In one embodiment, the GO suspension is an aqueous suspension made by sonicating GO in deionized water. The time for sonication can range from 0.25-24 hours. The concentration of GO in the reaction mixture can be 0.1 $mg/cm^3$ or more, or 1 $mg/cm^3$ or more, or 2 $mg/cm^3$ or more, or 5 $mg/cm^3$ or more, or 10 $mg/cm^3$ or more.

In some embodiments, the reaction mixture comprises a carbon nanotube suspension. See Worsley, et al., *J. Mater. Chem.,* 19:3370 (2009), which is incorporated herein by reference in its entirety. In one embodiment, the carbon nanotube suspension is an aqueous suspension. In another embodiment, the carbon nanotube suspension is a suspension of at least one organic solvent. In one embodiment, the carbon nanotube suspension is an aqueous suspension made by sonicating carbon nanotubes in deionized water. The time for sonication can range from 0.25-24 hours. The concentration of carbon nanotubes in the reaction mixture can be, for example, 0.1 to 80 wt. %, 0.1 to 60 wt. %, 0.1 to 50 wt. %, or 0.1-32 wt. %. The upper percentage for the carbon nanotube concentration is not particularly limited except by practicalities for a particular system.

The reaction mixture may also comprise additional reactant known for sol gel reactions, though it is may not be necessary for gelation. In one embodiment, the reaction mixture comprises resorcinol-formaldehyde (RF), phloroglucinol-formaldehyde, phenol-formaldehyde, cresol-formaldehyde, or phenol-furfuryl alcohol. In one embodiment, the reaction mixture is free of RF. In another embodiment, the reaction mixture comprises RF. In a particular embodiment, the GO-to-RF ratio is 0.1 or more.

The reaction mixture also can comprise at least one sol gel catalyst. In one embodiment, the catalyst is an acid catalyst. In another embodiment, the catalyst is a base catalyst. An example is a hydroxide catalyst. Suitable catalysts include, but are not limited to, nitric acid, acetic acid, ascorbic acid, hydrochloric acid, sulfuric acid, sodium carbonate, sodium hydroxide, ammonium hydroxide, and calcium sulfate. The reactant-to-catalyst ratio may range from 10 to greater than 1000.

High-density graphene-based monoliths and high-density carbon-nanotube-based monoliths can be made from the reaction mixture according to the following steps: (i) curing the reaction mixture to produce a wet gel; (ii) drying the wet gel to produce a dry gel, said step is substantially free of supercritical drying and freeze drying; and (iii) pyrolyzing the dry gel to produce a high-density graphene-based monolith or a high-density carbon-nanotube-based monolith.

In one embodiment, the reaction mixture is cured at a temperature of 25-100° C. to produce a wet gel. In another embodiment, the reaction mixture is cured for 12-72 hours at a temperature of 85° C. In a further embodiment, the reaction mixture is cured at atmospheric pressure.

In one embodiment, the wet gel is subjected to solvent exchange to remove reaction by-products. Suitable solvent include, but are not limited to, DI water. In another embodiment, the wet gel is subjected to solvent exchange to remove water. Suitable solvents include, but are not limited to, acetone.

In one embodiment, the wet gel is dried under ambient temperature and pressure. In one embodiment, the wet gel is dried under ambient temperature and pressure for at least 24 hours. The application of heat can be avoided. In particular, the drying step can comprise drying the wet gel to produce a dry gel without application of heat to raise the temperature beyond ambient temperature. The drying step is carried out without supercritical drying. If desired, some heat can be applied for increasing the speed of drying, but it is not essential or required in many or all embodiments.

In one embodiment, the dry gel is pyrolyzed in an inert gas to produce a high-density graphene-based monolith or a high-density carbon-nanotube-based monolith. Suitable inert gases include, but are not limited to, nitrogen. The pyrolyzing temperature can be 500° C. or more, or 800° C. or more, or 1000° C. or more. The pyrolyzing temperature can be, for example, less than 2,500° C., or less than 2,000° C., or less than 1,500° C.

Applications

The monoliths, including high-density graphene-based monolith and the high-density carbon-nanotube-based monolith, described herein can be used in a variety of devices. For example, they can be used in electrodes, batteries, capacitors, supercapacitors, sensors, actuators, membranes, structural elements, furnace components, catalyst supports, and hydrogen storage devices. In a particular embodiment, the high-density graphene-based monolith described herein is used in a lithium battery electrode. Other applications can include, for example, lightweight armor, missile nose cone, and high temperature/thermal shock applications.

In addition, graphene monoliths can also be used to shield sensitive electronic devices like cell phones, personal digital assistants, computers, and hospital equipment from Electromagnetic Interference (EMI) and Radio Frequency Interference (RFI). Shielding must be electrically conductive and traditionally made of metal, which poses a weight problem for smaller electronics. Additionally, graphene monoliths are lightweight materials that outperform metal shielding. Positive attributes of graphene monoliths in this application include light weight, resistance to corrosion, and flexibility.

Additional embodiments are provided in the following non-limiting working examples.

WORKING EXAMPLES

Example 1

Material Synthesis

In a typical reaction, graphene oxide (GO) was suspended in deionized water and thoroughly dispersed using a VWR Scientific Model 75T Aquasonic (sonic power ~90 W, frequency ~40 kHz). The concentration of GO in the reaction mixture was 2 wt %. To determine the optimal conditions for GO dispersion, a range of sonication times (4 to 24 hrs) was evaluated. Once the GO (3 ml) was dispersed, concentrated ammonium hydroxide (633 µl) was added to the dispersion. The sol-gel mixture was then transferred to glass molds, sealed and cured in an oven at 85° C. for 12-72 h. The resulting gels were then removed from the molds and washed with deionized water to remove reaction byproducts and excess ammonium hydroxide. Then the gels were washed in acetone to remove all the water from the pores of the gel network. The wet gels were subsequently dried under ambient conditions to yield the high-density reduced GO assemblies. Some samples were also dried using supercritical $CO_2$ to produce low-density reduced GO assemblies for comparison. The reduced GO assemblies were thermally reduced via pyrolysis at 1050° C. under a $N_2$ atmosphere for 3 h. The 3D graphene macroassemblies were isolated as black cylindrical monoliths.

Characterization

Field-emission scanning electron microscopy (SEM) characterization was performed on a JEOL 7401-F at 5-10 keV (20 mA) in secondary electron imaging mode with a working distance of 2-8 mm. Surface area determination were performed by Brunauer-Emmett Teller (BET) and Barrett-Joyner-Halenda (BJH) methods using an ASAP 2000 Surface Area Analyzer (Micromeritics Instrument Corporation) (Gregg et al. *Adsorption, Surface Area and Porosity*, 2nd ed.; Academic: London, 1982). Samples of approximately 0.1 g were heated to 150° C. under vacuum ($10^{-5}$ Torr) for at least 24 hours to remove all adsorbed species. X-ray diffraction (XRD) measurements were performed on a Bruker AXS D8 ADVANCE X-ray diffractometer equipped with a LynxEye 1-dimensional linear Si strip detector. The samples were scanned from 5 to 75° 2θ. The step scan parameters were 0.02° steps and 2 s counting time per step with a 0.499° divergence slit and a 0.499° antiscatter slit. The X-ray source was Ni-filtered Cu radiation from a sealed tube operated at 40 kV and 40 mA. Phases in the samples were identified by comparison of observed peaks to those in the International Centre for Diffraction Data (ICDD PDF2009) powder diffraction database, and also peaks listed in reference articles. Goniometer alignment was ensured using a Bruker-supplied $Al_2O_3$ standard.

Monoliths were machined with a 6-mm-diameter cylindrical endmill rotating at a speed of $2\times10^4$ revolutions per minute, yielding macroscopically flat surfaces needed for mechanical characterization by indentation. The samples were indented in the load-controlled mode in an MTS XP nanoindenter with a flat punch diamond tip with an effective diameter of 62 microns. Representative indentation stress (σ) and strain (ε) were defined as $\sigma=4P/(\pi D^2)$ (i.e., the average contact pressure) and $\epsilon=4h/(\pi D)\approx h/D$ (i.e., the proportionality coefficient between σ and the reduced modulus in the elastic regime) (Kucheyev et al., *Acta Materialia* 57, 3472, 2009). Here, P is the load, D is the indenter tip diameter, and h is the indenter displacement. Both loading and unloading rates were kept constant to maintain an indentation strain rate of $10^{-3}$ s$^{-1}$ (Kucheyev et al., *Acta Materialia* 57, 3472, 2009). Elastic properties are characterized by the Young's modulus, which was calculated based on the initial slope of the unloading curve according to the Oliver-Pharr method (Oliver et al., *Journal of Materials Research* 7, 1564, 1992) for maximum loads below those resulting in failure events. In Oliver-Pharr calculations, we assumed Poisson's ratios of diamond and aerogels of 0.07 and 0.2, respectively, and the Young's modulus of diamond of 1141 GPa (Kucheyev et al., *Acta Materialia* 57, 3472, 2009). Several (>10) measurements of the Young's modulus, failure stress, and failure strain were made on different sample locations, and results were averaged. The error bars given are standard deviations. Electrical conductivity was measured using the four-probe method with metal electrodes attached to the ends of cylindrical samples. The amount of current transmitted through the sample during measurement was 100 mA, and the voltage drop along the sample was measured over distances of 3 to 6 mm. Seven or more measurements were taken on each sample, and results were averaged. Bulk densities of the samples were determined from the physical dimensions and mass of each sample.

Analysis

Described here is a straightforward relatively low-temperature method to realize macroscopic 3D graphene-derived carbons (GDCs) with isotropic properties approaching those of graphene sheets. Important factors for assembling a macrostructure with such properties are (i) the development of strong covalent links between graphene sheets that facilitate both electrical conductivity and structural reinforcement, (ii) sufficient restacking of graphene sheets to reach relatively high densities of ~1 g/cm$^3$, and (iii) an assembly that can be carbonized at relatively low temperatures (~1000° C.).

In order to form strong links between graphene sheets in GDCs, a method based on chemical cross-linking of individual sheets of graphene oxide (GO) suspended in water was used. Such cross-linking involves various GO functional groups (e.g., epoxide and hydroxide), yielding a reduced GO gel. Similar approach was used in the synthesis of exceptionally stiff and electrically conductive low-density graphene macroassemblies (GMAs) (Worsley et al., *Chem Commun*, 48, 8428 (2012)). The restacking of graphene sheets in the GDC was achieved by simply drying the reduced GO gel under ambient conditions instead of using a supercritical solvent extraction method that preserves the low-density structure and minimizes sheet restacking in GMAs. The dried monoliths were then annealed at about 1000° C. to reduce the organic cross-links to sp$^2$ carbon cross-links. Resultant GDCs displayed isotropic bulk properties such as electrical conductivities and Young's moduli that are 3-6 orders of magnitude higher than for any previously reported 3D graphene assembly, and exceeding isotropic graphite that is nearly twice as dense.

Synthesis of GDCs was carried out via gelation of a GO suspension under basic conditions. Full experimental details is provided above in the Material Synthesis section. Briefly, in a typical synthesis, ultrasonication is used to disperse 2 wt % GO in deionized water. Concentrated NH$_4$OH was added (211 µl/g GO suspension) to the suspension, which was then sealed and placed in an oven at 85° C. to gel. After gelation, the reduced GO gel was washed first in deionized water and then in acetone. After that, the gel was allowed to dry under ambient conditions for at least 24 hours, followed by annealing at 1050° C. under nitrogen to yield the final GDC with a monolith density of ~1.0 g/cm$^3$. This is an ~10-fold increase in the density compared to GMAs that have densities of ~0.10 g/cm$^3$. Importantly, the randomly orientated self-assembly during gelation combined with the capillary force-induced shrinkage led to the formation of a completely isotropic material. FIG. 1 shows monoliths immediately after gelation, after supercritical drying, and after ambient drying to illustrate the shrinkage that occurred upon solvent removal. There are few limits on the shapes and sizes of the GDCs produced since, in addition to being readily mechanically machined, the GDC conforms to the mold in which the initial reaction mixture is placed.

Figure 2:
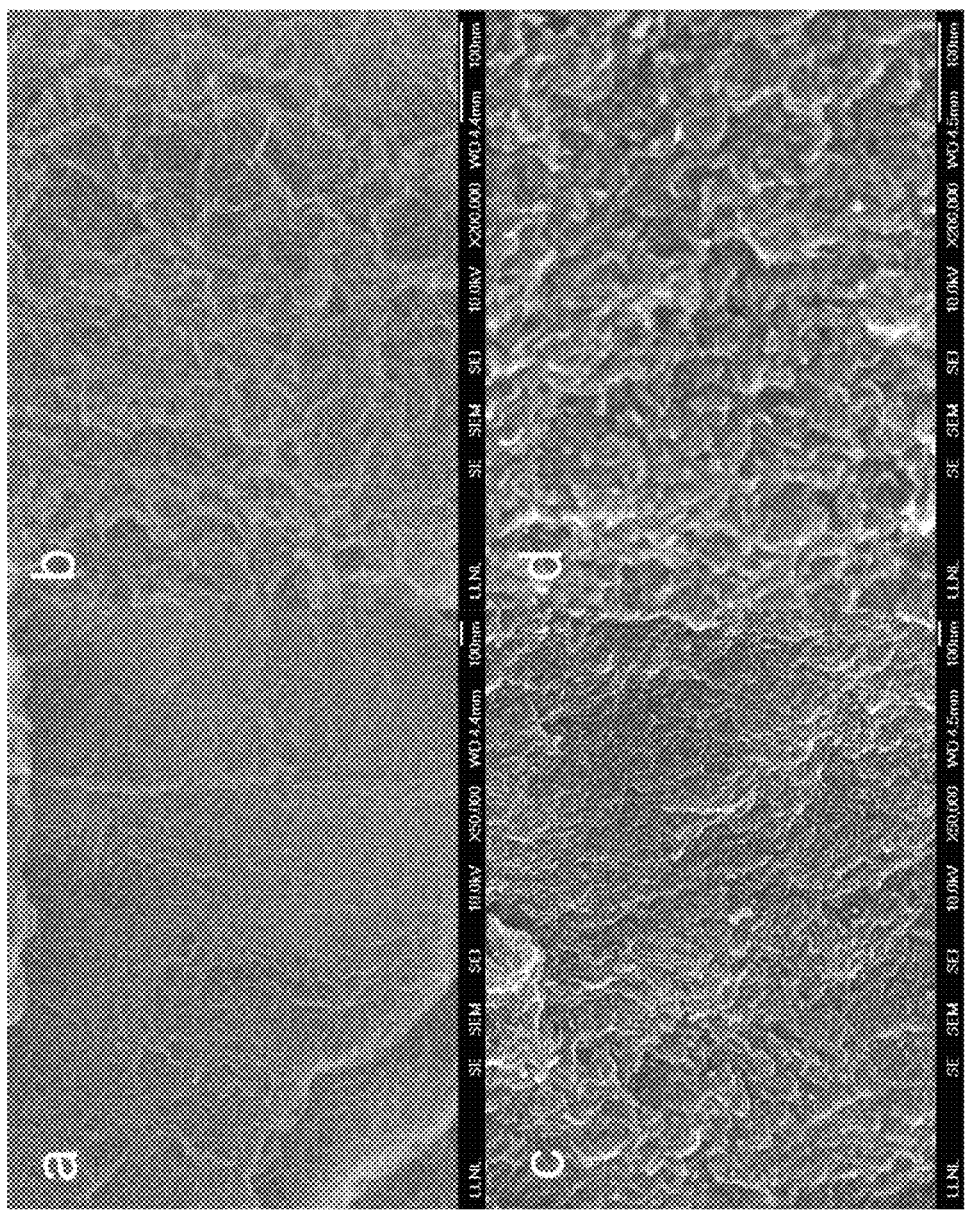
FIG. 2 shows FE-SEM images of a fracture surface of the GMA (a,b) and GDC (c,d) at low and high magnification.

The difference between the microstructure of GDCs and GMAs was illustrated by scanning electron microscopy (SEM) images in FIG. 2. GMAs were made of randomly interconnected graphene sheets with a minimal restacking (FIG. 2*a-b*) resulting in fine sheet-like features and a large porosity of ~95% (Bai et al., *The Journal of Physical*

*Chemistry C* 115, 5545 (2011); Chen et al., *Nanoscale* 3, 3132 (2011); Sui et al., *Carbon* 49, 4314 (2011); Wang et al., *ECS Transactions* 19, 241 (2009); Worsley et al., *Chem Commun,* 48, 8428 (2012); Worsley et al., *J. Am. Chem. Soc.* 132, 14067 (2010); Xu et al., *ACS Nano* 4, 4324 (2010); Yin et al., *Small,* 8, 16, 2458 (2012)).

In contrast, no fine sheet-like features were distinguishable in the GDC in FIG. 2c-d. However, the SEM shows that the GDC was homogenous and contained many small pores (less than ~20 nm). These pores contributed to the material's density being roughly half of the density for single crystalline graphite made of perfectly stacked graphene sheets (2.2 g/cm$^3$). This apparently open-cell porosity of the GDC is consistent with the measured Brunauer-Emmett-Teller (BET) surface area of 69 m$^2$/g.

Figure 3:
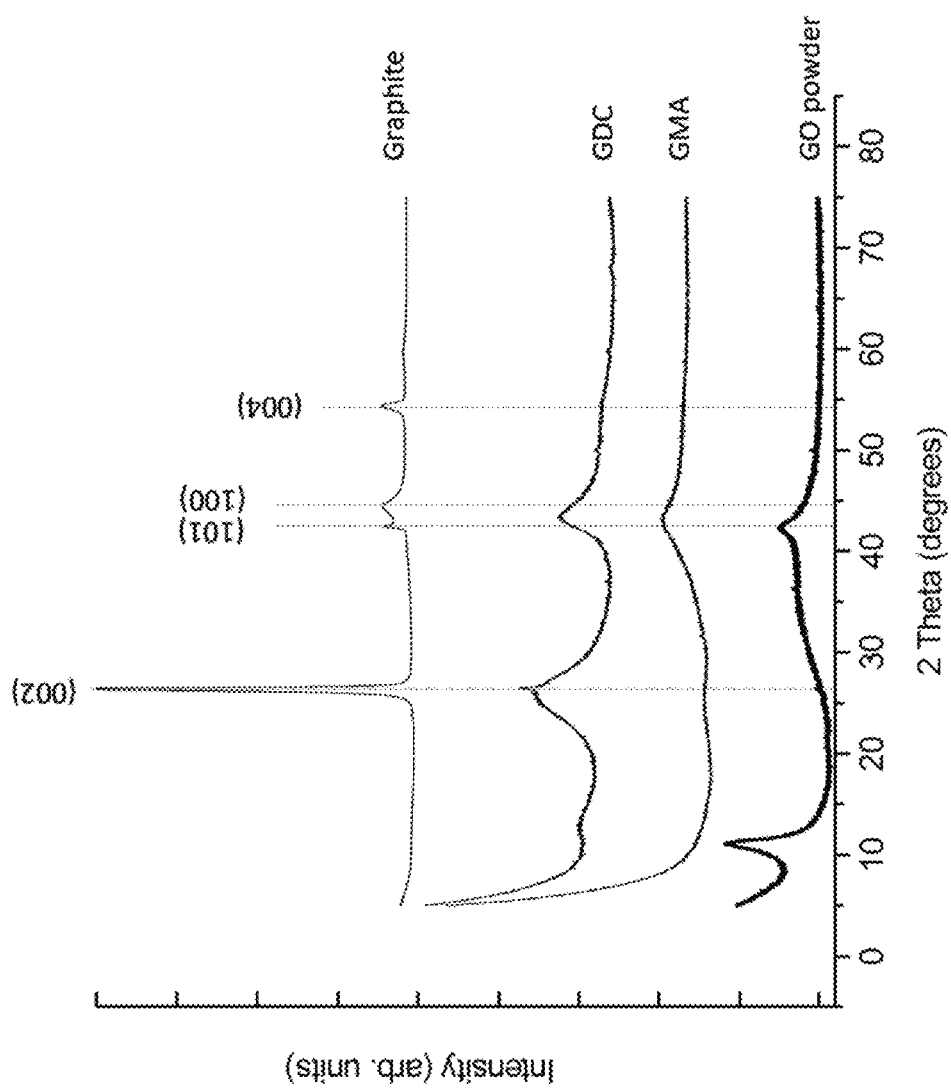
FIG. 3 shows XRD spectra for GDC, GMA, GO powder and commercial graphite.
Figure 4:
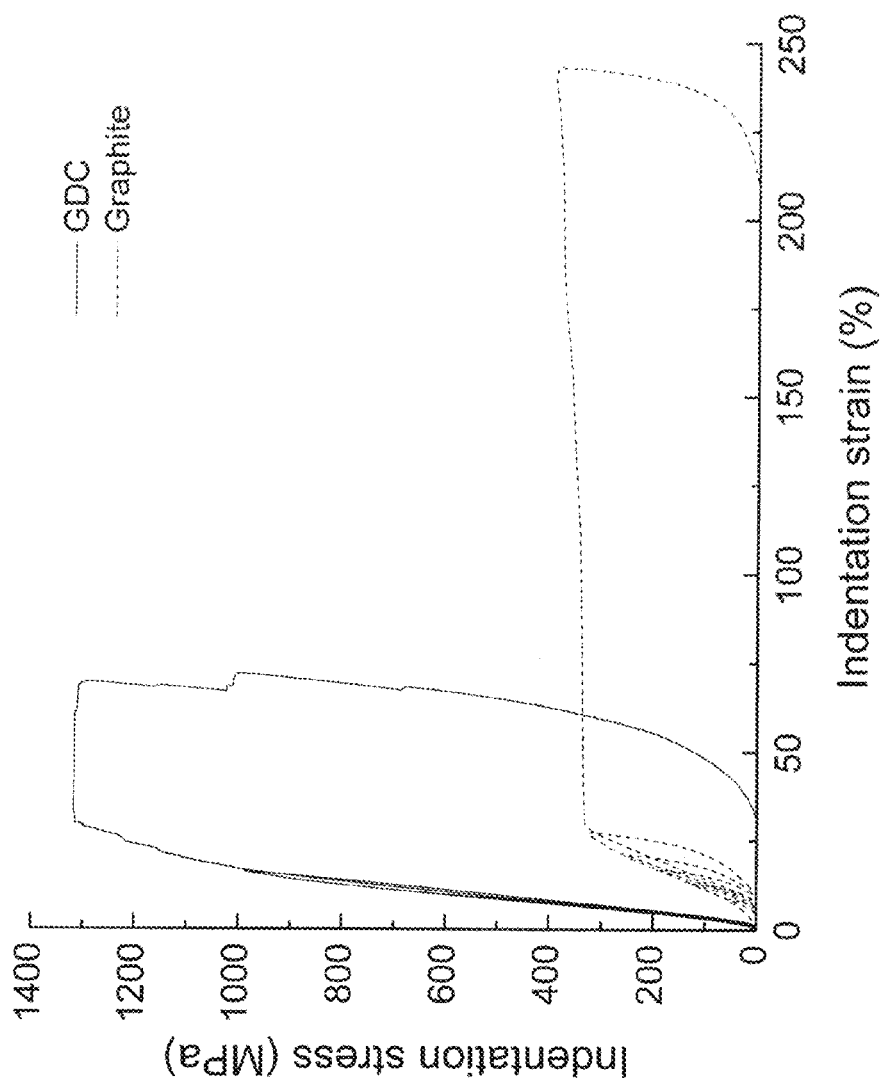
FIG. 4 shows nanoindentation stress vs strain plot for GDC. Graphite included for reference.

The x-ray diffraction (XRD) patterns for GDCs and GMAs also showed significant deviations (FIG. 3). The appearance of peaks at ~12° and 26.5° for the GDC contrasted sharply with their absence in the low-density analog. For the GMA, XRD revealed that only single and few-layer sheets exist (Worsley et al., *Chem Commun,* 48, 8428 (2012)), evidenced by the absence of the (002) diffraction peak (at 26.5°) assigned to the basal spacing of graphite (0.35 nm). However, the GDC showed a strong (002) peak at 26.5°, indicating significant graphene sheet restacking, which is consistent with an increased monolith density, though not to the degree observed in commercial graphite. In addition to the (002) peak, the XRD pattern of the GDC exhibited a peak at ~12° suggesting that there was a fraction of sheets with a substantially larger interlayer spacing of ~0.74 nm. As the O content of the GDC was less than 2%, (FIG. 4), same as for the GMA, it is unlikely that this peak at ~12° resulted from incomplete reduction as might be supposed given its proximity to the 001 reflection of graphene oxide. Instead, this larger spacing might be attributed to incomplete and imperfect restacking caused by random orientation and curvature of graphene sheets, resulting from our sheet-to-sheet cross-linking scheme. It is possible that this larger spacing further contributed to the lower (relative to graphite) GDC density of ~1 g/cm$^3$.

Figure 5:
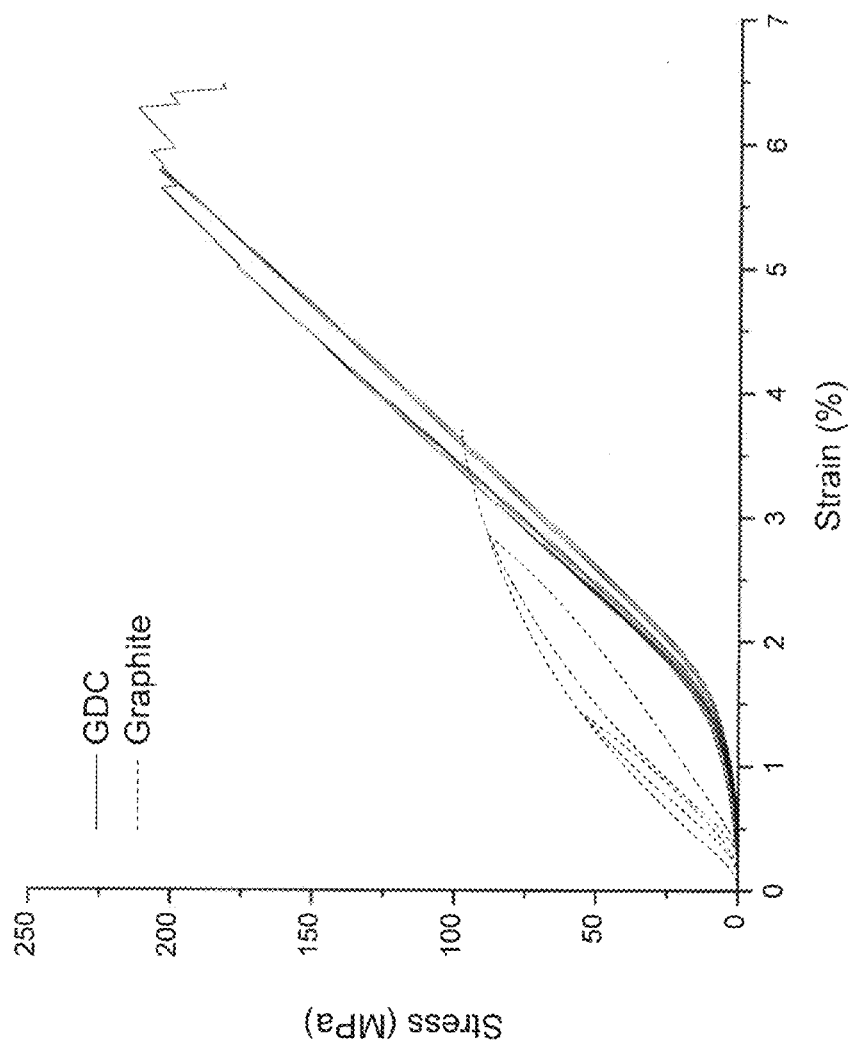
FIG. 5 shows uniaxial compression plot for GDC and graphite.

Despite having a density of close to half of that of perfectly stacked graphene sheets (2.2 g/cm$^3$) or even commercial grade graphite (1.6-1.9 g/cm$^3$), the mechanical properties of the GDC exceeded those of graphite. Nanoindentation results (FIG. 5) showed that the GDC exhibits a Young's modulus of ~10 GPa and a failure stress of ~1.2 GPa independent of the loading direction. These exceeded respective nanoindentation values of 8.5 GPa and 0.4 GPa (also independent of loading direction) for commercial grade graphite (see http://www.mcmaster.com/#graphite-rods/=kkbdgu) with a much larger density of 1.7 g/cm$^3$. Uniaxial compression results also showed that the GDC has a high compressive strength of ~200 MPa compared to only ~98 MPa for the commercial graphite material. The measured compressive strength for commercial graphite is consistent with reported values of 40-193 MPa, depending on the material density (1.6-1.9 g/cm$^3$) and defect content (see http://www.mcmaster.com/#graphite-rods/=kkbdgu; http://www.poco.com/tabid/70/Default.aspx; http://www.roccarbon.com/cgrawmaterials.html).

Figure 6:
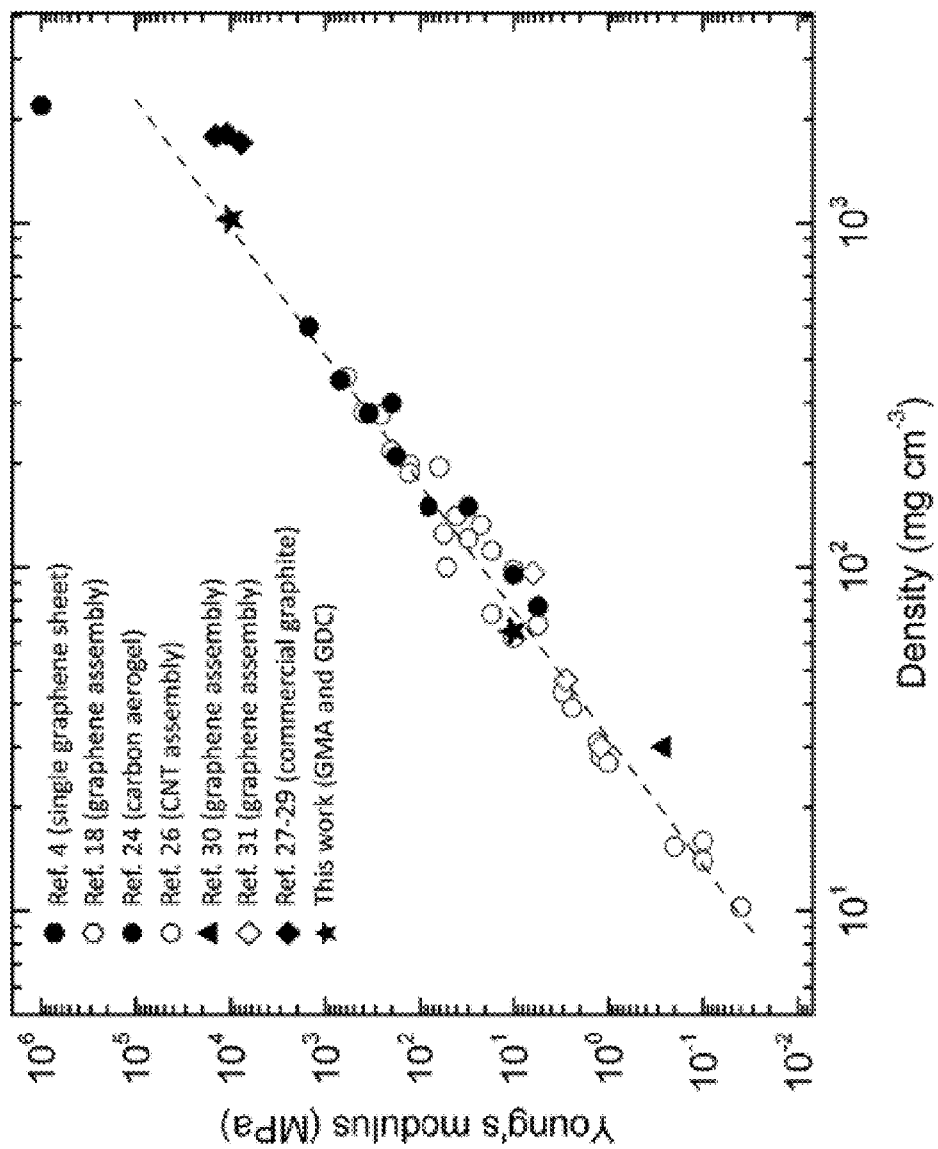
FIG. 6 shows log-log plot of Young's modulus as a function of density.

Considering that Young's modulus depends superlinearly on monolith density, ρ, for nanoporous materials with an exponent, n, in the range of 2-4, FIG. 6 shows a density dependence of the modulus for a number of carbon materials, including carbon aerogels (Pekala et al., *Journal of Non-Crystalline Solids* 125, 67 (1990)), carbon-nanotube (CNT) assemblies (Worsley et al., *Applied Physics Letters* 94, 7, 073115 (2009)), graphene (Lee et al, *Science* 321, 385 (2008); Koenig et al., *Nat Nano* 6, 543 (2011)), graphene-based materials (Worsley et al., *Chem Commun,* 48, 8428 (2012); Tang et al., *Angew Chem Int Edit* 49, 4603 (2010); Zhang et al., *J Mater Chem* 21, 6494 (2011)), and graphite. FIG. 6 shows that the modulus of the GDC scales with density as expected for CNT- or graphene-based materials with n=2.5.

FIG. 6 suggests that if the density of the GDC could be further increased to ~2 g/cm$^3$, the modulus would come within an order of magnitude of that for an individual atomically perfect graphene sheet (10$^6$ MPa). The scaling of the modulus to a value lower than that of an atomically perfect graphene sheet probably stems from random orientation and curvature of graphene sheets as well as lattice defects. Nevertheless, it is quite remarkable that the GDC exhibited properties so close to those expected based on the density scaling of an assembly of atomically perfect graphene sheets.

Figure 7:
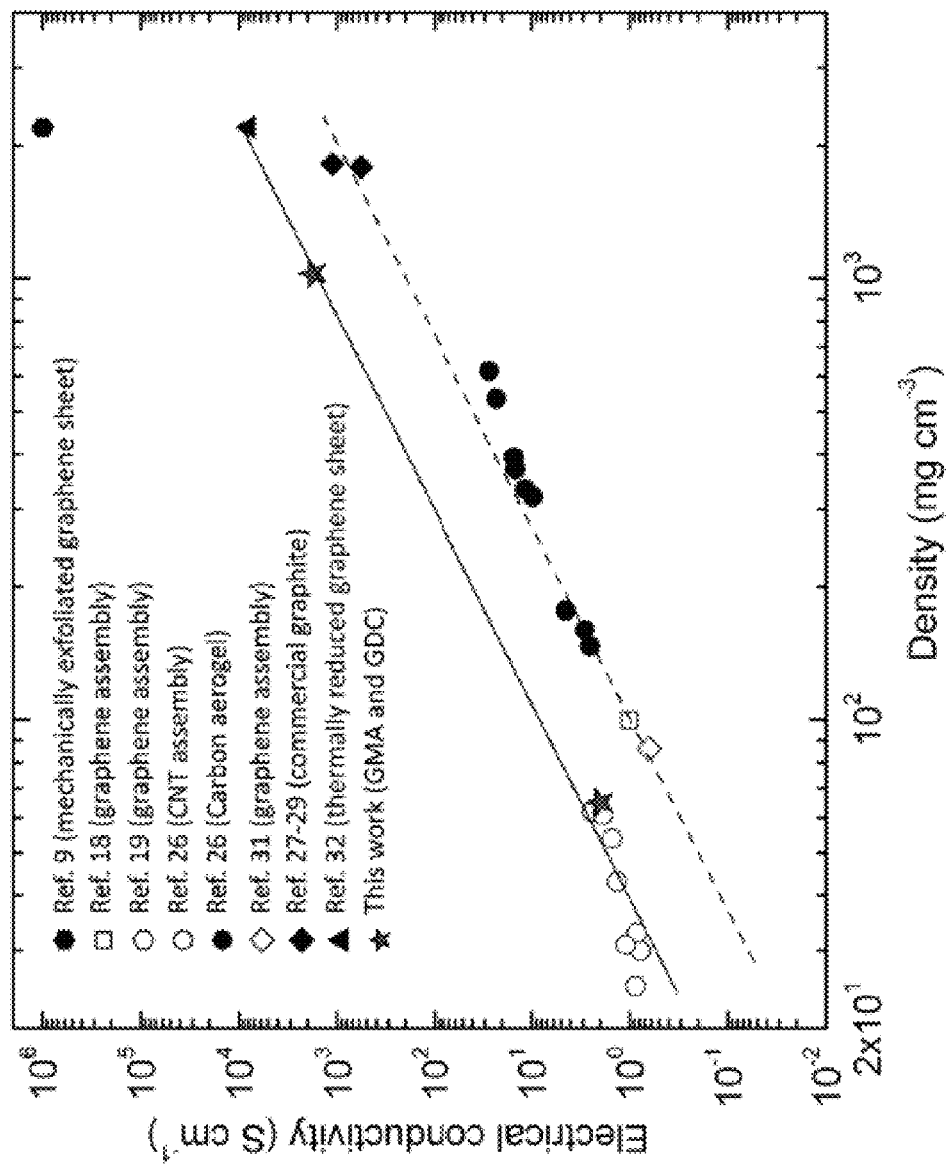
FIG. 7 shows log-log plot of conductivity as a function of density.

The bulk electrical conductivity of the GDC, determined via the four-probe method, was 1,750 S/cm, which is likely larger than for any 3D graphene assembly reported. FIG. 7 plots the density dependence of the electrical conductivity of the GDC along with other reported 3D graphene (Worsley et al., *Chem Commun,* 48, 8428 (2012); Worsley et al., *J. Am. Chem. Soc.* 132, 14067 (2010); Zhang et al., *J Mater Chem* 21, 6494 (2011)) and CNT assemblies (Worsley et al., *Applied Physics Letters* 94, 7, 073115 (2009)), carbon aerogels (Worsley et al., *Applied Physics Letters* 94, 7, 073115 (2009)), graphite, and individual graphene sheets (Chen et al., *Nat Nano* 3, 206 (2008); Wu et al., *ACS Nano* 3, 411 (2009)). Similar to the scaling of Young's modulus discussed above, electrical conductivity, σ, scales superlinearly with the material density (σ~ρ$^{1.5}$). FIG. 7 shows that, despite pronounced restacking of graphene sheets revealed by an increased density and combined SEM, XRD, and BET observations, the GDC follows the scaling law for CNT- and graphene-based materials, extrapolating to a conductivity of ~10$^4$ S/cm at ~2 g/cm$^3$. This result is approximately 2 orders of magnitude less than what was observed for a perfect graphene sheet, highlighting how sensitive the electrical conductivity is to defects, sheet curvature, sheet stacking, and orientation (in-plane vs. through-plane). A scaled GDC conductivity of ~10$^4$ S/cm is, however, consistent with experimental conductivity values for individual graphene sheets thermally reduced from GO (Wu et al., *ACS Nano* 3, 411 (2009)) and is an order of magnitude higher than that of commercial graphite.

Example 2

In a typical reaction, purified CNTs were suspended in deionized water and thoroughly dispersed using a VWR Scientific Model 75T Aquasonic sonication bath (sonic power ~90 W, frequency ~40 kHz). The concentration of CNTs in the reaction mixture ranged from 0 wt % to 2 wt %. To determine the optimal conditions for CNT dispersion, a range of sonication times (4 to 24 hrs) were evaluated. Once the CNTs were dispersed, resorcinol (1.235 g, 11.2 mmol), formaldehyde (1.791 g, 22.1 mmol), and sodium carbonate catalyst (5.95 mg, 0.056 mmol) were added to the reaction solution. The resorcinol to catalyst ratios (R/C) employed for the synthesis of the composites range from 50 to 200. The sol-gel mixture was then transferred to glass molds, sealed and cured in an oven at 85° C. for 72 h. The resulting gels were then removed from the molds and washed with acetone for 72 h to remove water from the pores of the gel network. The wet gels were subsequently dried under ambient conditions and pyrolyzed at 1050° C. under a $N_2$ atmosphere for 3 h. The composite materials were isolated as black cylindrical monoliths. Foams with CNT loadings ranging from 0 to ~90 wt %, or ranging from 0 to ~99 wt %, were prepared by this method. The rest of the material can be, in many cases, carbon aerogel particles that "glue" the CNTs together. These particles can, it is believed, come from the resorcinol-formaldehyde (RF) solution in which the CNTs are originally suspended and gelled. The RF forms an organic gel which connects the CNTs. The organic "glue" is converted to carbon during pyrolysis at, for example, 1050° C. in nitrogen.

Hence, described herein in some embodiments is a straightforward method to realize high-density graphene-based macroassemblies with isotropic mechanical and electronic transport properties approaching those of individual graphene sheets. The design strategy involved, in some embodiments, direct cross-linking of graphene sheets via the functional groups in graphene oxide and sufficient restacking of the graphene sheets to increase the material density. The nature of the synthesis led to a much lower temperature used than for the synthesis of commercial isotropic graphite and facilitated fabrication with few limits on the size or shape. The development of 3D bulk macrostructures retaining properties of individual graphene sheets will both expand and accelerate the commercialization of graphene-based technologies and products.

Finally, the following references can be referred to practicing embodiments described herein and some are noted in FIGS. 6 and 7.

REFERENCES

1. K. S. Novoselov et al., *Science* 306, 666 (Oct. 22, 2004).
2. C. Gomez-Navarro et al., *Nano Letters* 7, 3499 (NOVEMBER 2007).
3. A. K. Geim, K. S. Novoselov, *Nature Materials* 6, 183 (MARCH 2007).
4. C. Lee, X. Wei, J. W. Kysar, J. Hone, *Science* 321, 385 (Jul. 18, 2008, 2008).
5. J. R. Miller, R. A. Outlaw, B. C. Holloway, *Science* 329, 1637 (September, 2010).
6. K. S. Novoselov et al., *Science* 315, 1379 (Mar. 9, 2007).
7. F. Schedin et al., *Nature Materials* 6, 652 (SEPTEMBER 2007).
8. Y. W. Zhu et al., *Adv Mater* 22, 3906 (September, 2010).
9. J.-H. Chen, C. Jang, S. Xiao, M. Ishigami, M. S. Fuhrer, *Nat Nano* 3, 206 (2008).
10. S. P. Koenig, N. G. Boddeti, M. L. Dunn, J. S. Bunch, *Nat Nano* 6, 543 (2011).
11. H. Bai, C. Li, X. Wang, G. Shi, *The Journal of Physical Chemistry C* 115, 5545 (2011).
12. H. Bi et al., *Adv Mater* 24, 5124 (2012).
13. J. Biener et al., *Adv Mater*, (2012).
14. W. Chen, L. Yan, *Nanoscale* 3, 3132 (2011).
15. Y. Lin, G. J. Ehlert, C. Bukowsky, H. A. Sodano, *Acs Applied Materials & Interfaces* 3, 2200 (July, 2011).
16. Z. Sui, X. Zhang, Y. Lei, Y. Luo, *Carbon* 49, 4314 (November, 2011).
17. J. Wang, M. Ellsworth, *ECS Transactions* 19, 241 (2009).
18. M. A. Worsley et al., *Chem Commun*, (2012).
19. M. A. Worsley et al., *J. Am. Chem. Soc.* 132, 14067 (Sep. 22, 2010, 2010).
20. Y. Xu, K. Sheng, C. Li, G. Shi, *ACS Nano* 4, 4324 (2010).
21. X. Yang et al., *Angew Chem Int Edit* 50, 7325 (2011, 2011).
22. S. Yin, Z. Niu, X. Chen, *Small*, n/a (2012).
23. J. Gross, J. Fricke, R. W. Pekala, L. W. Hrubesh, *Physical Review B* 45, 12774 (Jun. 1, 1992).
24. R. W. Pekala, C. T. Alviso, J. D. Lemay, *Journal of Non-Crystalline Solids* 125, 67 (NOVEMBER 1990).
25. R. W. Pekala, C. T. Alviso, X. Lu, J. Gross, J. Fricke, *Journal of Non-Crystalline Solids* 188, 34 (July, 1995).
26. M. A. Worsley, S. O. Kucheyev, J. H. Satcher, A. V. Hamza, T. F. Baumann, *Applied Physics Letters* 94, (Feb. 16, 2009).
27. http://www.mcmaster.com/#graphite-rods/=kkbdgu.
28. http://www.poco.com/tabid/70/Default.aspx.
29. http://www.roccarbon.com/cgrawmaterials.html.
30. Z. H. Tang, S. L. Shen, J. Zhuang, X. Wang, *Angew Chem Int Edit* 49, 4603 (2010).
31. X. Zhang et al., *J Mater Chem* 21, 6494 (2011).
32. Z.-S. Wu et al., *ACS Nano* 3, 411 (2009).

What is claimed is:

1. A composition comprising at least one high-density graphene-based monolith, said monolith comprising a three-dimensional structure of restacked graphene sheets directly crosslinked by covalent carbon bonds, wherein the monolith has an electrical conductivity of at least 500 S/cm and a density of at least 0.2 g/cm$^3$, wherein less than 10% of the graphene sheets are interconnected only by van der Waals force, and wherein the monolith has a Young's modulus of at least 5 GPa.

2. The composition of claim 1, wherein the surfaces of the graphene sheets are free of carbon nanoparticles.

3. The composition of claim 1, wherein in the monolith at least 70% of the covalent carbon bonds between the graphene sheets are sp$^2$ bonds.

4. The composition of claim 1, wherein the monolith has a density of at least 0.5 g/cm$^3$.

5. The composition of claim 1, wherein the monolith has an electrical conductivity of at least 1000 S/cm.

6. The composition of claim 1, wherein the monolith has a failure stress of at least 0.5 GPa.

7. The composition of claim 1, wherein the monolith has a compressive strength of at least 100 MPa.

8. The composition of claim 1, wherein the monolith has (i) a density of at least 0.5 g/cm$^3$, (ii) an electrical conductivity of at least 1000 S/cm, and (iii) a Young's modulus of at least 5 GPa.

9. A device comprising the composition of claim 1.

10. The device according to claim 9, wherein the monolith wherein monolith is incorporated into an electrode.

11. The device according to claim 9, wherein the monolith has (i) a density of at least 0.5 g/cm$^3$, (ii) an electrical conductivity of at least 1000 S/cm, and (iii) a Young's modulus of at least 5 GPa.

12. The device according to claim 9, wherein the device is a capacitor, a battery, an electrode, a sensor, an actuator, a membrane, a catalyst support, or a hydrogen storage device.

13. A method for obtaining the composition of claim 1, comprising:
preparing a reaction mixture comprising a suspension and at least one catalyst, said suspension is a graphene oxide (GO) suspension;
curing the reaction mixture to produce a wet gel;
drying the wet gel to produce a dry gel, said drying step is substantially free of supercritical drying and freezing drying; and pyrolyzing the dry gel to produce the composition comprising a high-density graphene-based monolith.

14. The method of claim 13, wherein the suspension is a GO suspension comprising water or at least one organic solvent.

15. The method of claim 13, wherein the suspension is a GO suspension comprising water or at least one organic solvent, and wherein the catalyst comprises ammonium hydroxide.

16. The method of claim 13, wherein the reaction mixture is cured at a temperature of 100° C. or less.

17. The method of claim 13, wherein the step of drying the wet gel comprises solvent exchange.

18. The method of claim 13, wherein the step of drying the wet gel comprises washing the wet gel with deionized water and subsequently with acetone.

19. The method of claim 13, wherein the step of drying the wet gel comprises drying the wet gel under ambient condition.

20. The method of claim 13, wherein the step of pyrolyzing the dry gel comprises annealing the dry gel in an inert atmosphere at a temperature of 500° C. or higher.

21. The method of claim 13, further comprising incorporating the high-density graphene-based monolith into an electrode.

* * * * *